(12) United States Patent
Reynolds

(10) Patent No.: US 6,713,989 B1
(45) Date of Patent: Mar. 30, 2004

(54) SOLARSWITCH

(75) Inventor: Robert L. Reynolds, Ventura, CA (US)

(73) Assignee: Solarmate Corporation, Redondo Beach, CA (US)

( * ) Notice: Subject to any disclaimer, the term of this patent is extended or adjusted under 35 U.S.C. 154(b) by 0 days.

(21) Appl. No.: 10/266,338

(22) Filed: Oct. 7, 2002

(51) Int. Cl.$^7$ ............................................. H01M 10/44
(52) U.S. Cl. ........................................................ 320/165
(58) Field of Search ................................. 320/101, 122, 320/127, 128, 132, 134, 136, 141, 165; 136/290, 291, 293

(56) References Cited

U.S. PATENT DOCUMENTS

| | | | | |
|---|---|---|---|---|
| 5,248,346 A | * | 9/1993 | Fraas et al. | |
| 5,389,158 A | * | 2/1995 | Fraas et al. | |
| 5,416,406 A | * | 5/1995 | Jette | |
| 6,037,749 A | * | 3/2000 | Parsonage | |

* cited by examiner

*Primary Examiner*—Edward H. Tso
(74) *Attorney, Agent, or Firm*—Philip T. Virga

(57) ABSTRACT

An active switch for electrically connecting and disconnecting a power source such as a solar array to a charge storage device is disclosed. The active switch allows a minimal amount of reverse back current flow from the charge storage device to the power source having a low on-resistance.

20 Claims, 5 Drawing Sheets

SOLARSWITCH

Conventional solar battery charging systems employ a "back flow" or reverse current diode to prevent battery current from flowing back through a solar array in the absence of solar energy. Typically, a Schottky diode is used for this reverse current protection due to a low forward voltage drop required for Schottky diode operation. The forward voltage drop has a direct impact on charge efficiency such that the less power that is dissipated across the diode, the more charge power is delivered to the battery. The charge efficiency has been acceptable when dealing with macro solar charging systems since the battery charge voltages have been typically "high" in ratio to the Schottky diode forward voltage drop. However, this is not desirable in micro solar charging systems where the charge voltages are not high in ratio to the Schottky diode forward voltage drop. Therefore it would be desirable to provide a circuit that prevents battery back flow current having less forward voltage drop than a Schottky diode.

SUMMARY OF THE INVENTION

An active switch for electrically connecting and disconnecting a power source such as a solar array to a charge storage device is provided. The active switch allows a minimal amount of reverse back current flow from the charge storage device to the power source and has a low on-resistance.

DESCRIPTION OF THE PREFERRED EMBODIMENT

Figure 1:
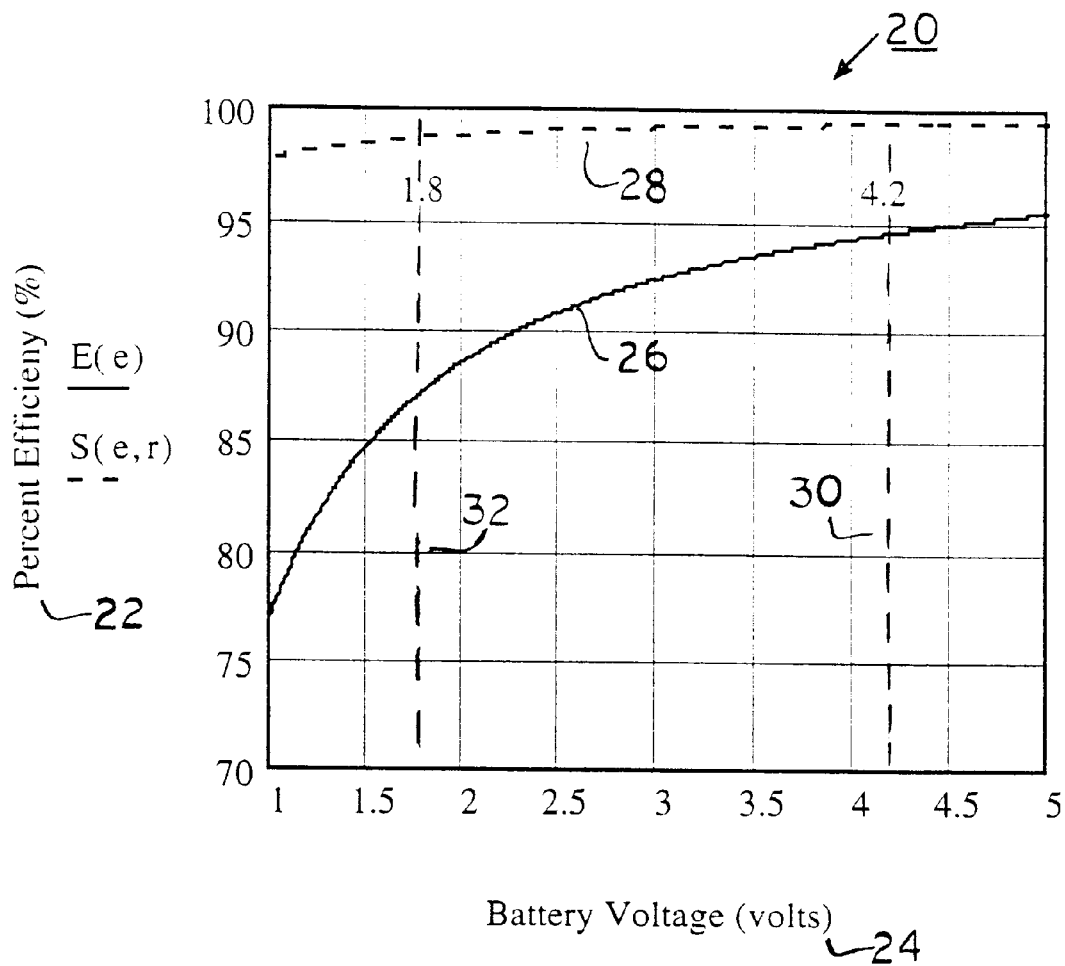
FIG. 1 is a graph illustrating the battery charge efficiency versus battery voltage characteristics of a diode compared to an active switch.

Micro solar devices and micro solar charging systems typically operate at voltages that are "low" in ratio to a Schottky diode forward voltage drop. This results in more power being dissipated in the diode and less charge power being delivered to a device or charge storage device. Referring to FIG. 1 there is shown a graph 20 illustrating battery charge efficiency 22 versus battery voltage 24 characteristics of a diode compared to an active switch. FIG. 1 shows the reduction in battery charge efficiency 22 as a function of battery voltage 24 due to the "series" back flow components. As shown by the solid line 26 the efficiency reduction, caused by a 0.23 volt drop of a Schottky diode, becomes more significant as the battery charge voltage decreases. A microelectronic device (not shown) such as a cellular phone will typically operate with a battery of 4.2 volts 30 or less. Other micro electronics devices operate at battery voltages down to 0.8 volts 32. As can be seen in FIG. 1, the solar charging efficiency will substantially degrade due to the power loss across the Schottky diode.

Turning once again to FIG. 1, the dashed trace 28 shows the "improved" solar charge efficiency of a "low loss" active switch serving the same function of back flow or reverse current protection. The active switch consists of a low voltage metal oxide semiconductor field effect transistor (hereinafter referred to as a MOSFET) with a very low source to drain resistance that is suitable for use in microelectronic devices such as a cellular phone or pocket charger. The active switch charge efficiency is based on a series "resistance" and not a "voltage drop" therefore the charge efficiency will increase further with less series current. The current used to simulate trace 28 is 200 ma which would typically be the high end of micro solar battery charging for a device such as a cellular phone.

Figure 2:
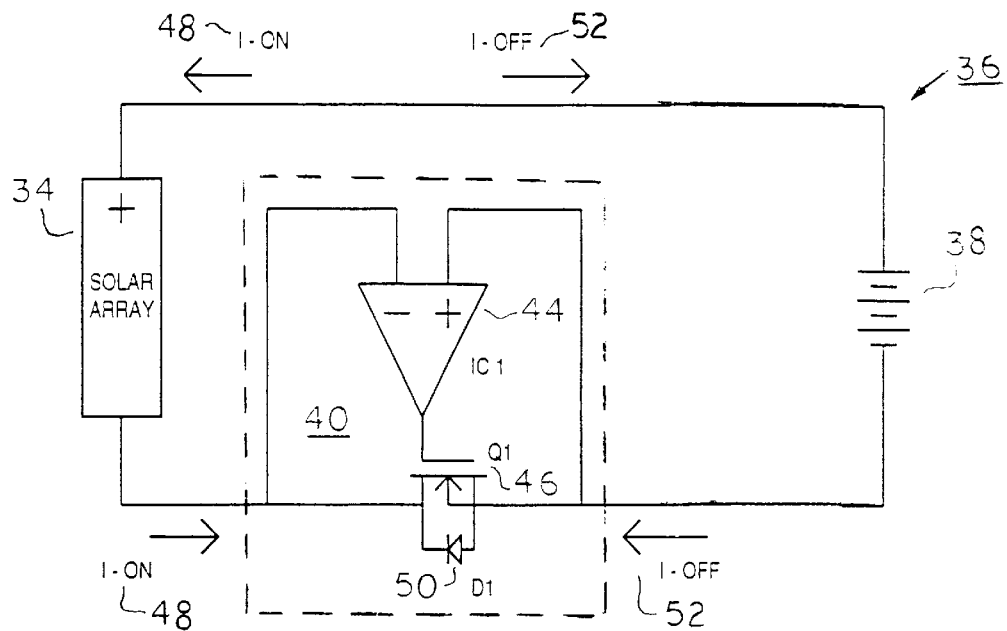
FIG. 2 shows a simplified circuit diagram incorporating an active switch circuit in a micro solar charging system.

FIG. 2 below shows a simplified circuit diagram 36 of an intermittent current limited power source such as a solar array 34 connected to a device for storing charge such as a battery 38 through an active switch circuit 40. The active switch circuit 40 substantially reduces the power that is lost by conventional reverse current diodes normally associated with solar charging devices. Referring once again to FIG. 2, the active switch circuit 40 consists of a reverse current detector IC-1 44 and a low loss N-channel enhancement mode MOSFET switch Q1 46 having an internal diode D1 50. In operation, incident solar energy generated by solar array 34 causes a counter clockwise current flow to occur as shown by "I-on" 48 in FIG. 2. The solar array 34 electromotive force (EMF) forward biases D1 50 and current begins to flow. The reverse current detector IC-1 44, which in this embodiment is shown as an differential amplifier detects the positive difference voltage across D1 50 at the non inverting input which causes Q1 46 to turn on. Q1 46 acts a low loss switch with a very low source to drain resistance overcoming the power loss associated with conventional diodes. The absence of solar energy incident upon the solar array 34 causes the current flow described above to stop and current from the battery attempts to flow in the reverse direction as indicated by "I-OFF" 52 in FIG. 2. The reverse current detector IC-1 44 detects a negative differential voltage at the non inverting input and causes Q1 46 to turn off.

More specifically, D1 50 and Q1 46 provide a voltage drop such that IC-1 46 is able to detect current flow without the addition of a series resistor that is normally present in current sensing applications. Thus the directional current sense detector is able to determine current flow without the usual power losses associated with series resistors. In this manner, it is a "loss less" current detection device since it adds no further power losses to the system. It should be understood that D1 50 additionally would not conduct current in the I-Off direction 52.

Figure 3:
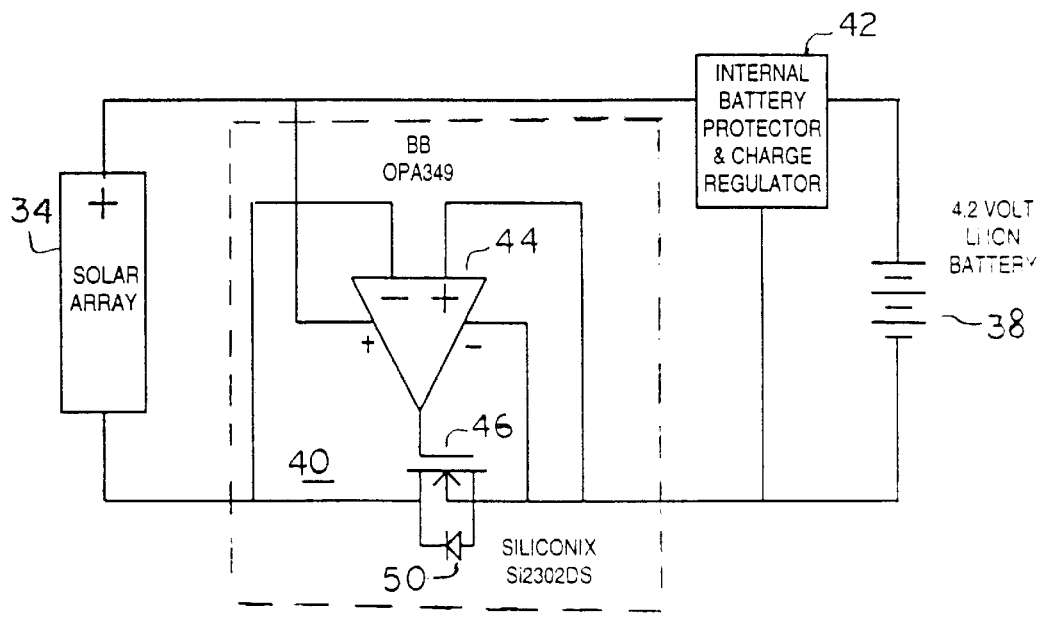
FIG. 3 shows a detailed circuit diagram implementing the active switch circuit of FIG. 2 with commercially available components.

FIG. 3 illustrates one example of a detailed circuit diagram for implementing the active switch circuit 40 of FIG. 2 with commercially available components. A solar array 34 having sufficient voltage for charging a 4.2 lithium ion battery 38 having an internal battery protection circuit and charge regulator 42 is shown in FIG. 3. The solar array 34 connects to the battery 38 through the battery regulator 42 and the active switch circuit 40. The active switch circuit 40 consists of a Burr-Brown operational amplifier (part number OPA349) IC-1 44 and a low loss Siliconix N-channel MOSFET (part number Si2302DS) switch Q1 46 having the internal diode D1 50. As described above, the solar array 34 electromotive force (EMF) forward biases D1 50 and current begins to flow. The Burr-Brown operational amplifier IC-1 44 detects the positive difference voltage across D1 50 at the non inverting input which causes Q1 46 to turn on and current begins to flow. The absence of solar energy causes the current flow described above to stop and current from the battery 38 attempts to flow in the reverse direction wherein the Burr-Brown operational amplifier IC-1 44 detects a negative differential voltage at the non inverting input and causes Q1 46 to turn off. The off-state current flow of IC-1 46 Is approximately 6 micro amp.

Figure 4:
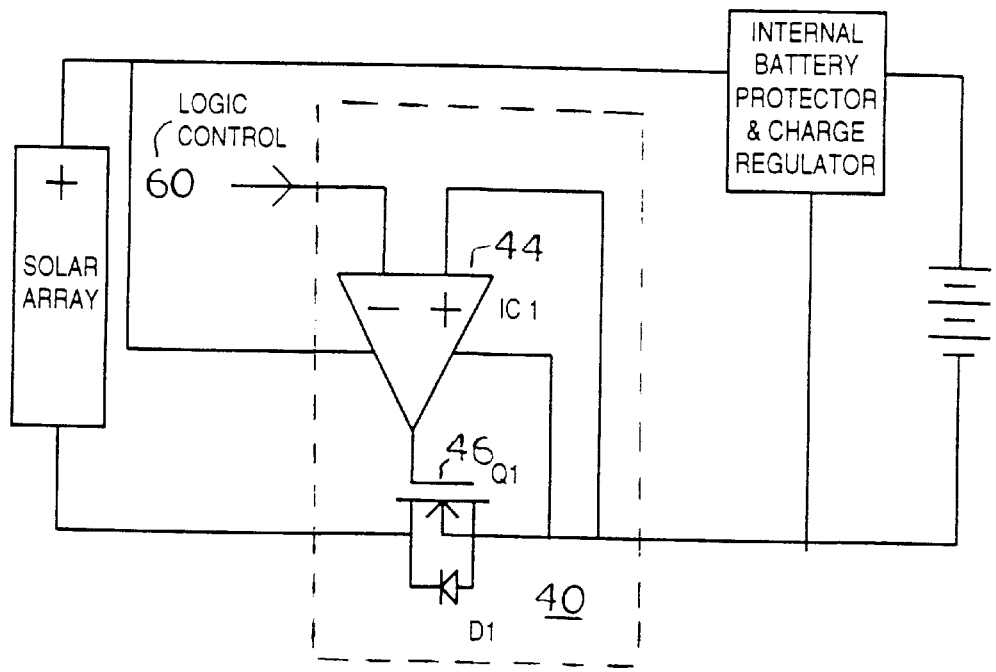
FIG. 4 shows a simplified circuit diagram incorporating an active switch circuit utilizing external logic input.
Figure 5:
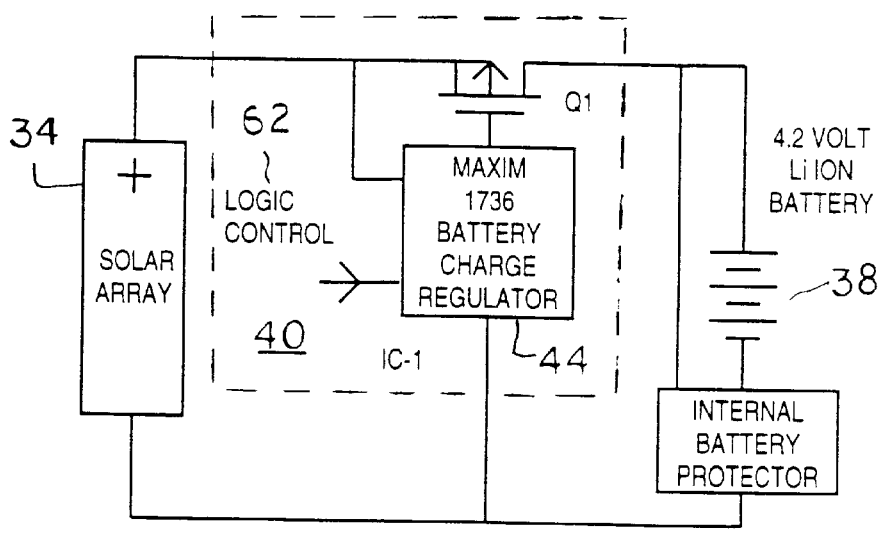
FIG. 5 shows a simplified circuit diagram incorporating an active switch circuit utilizing a battery charge regulator.

FIG. 4 shows a simplified circuit diagram incorporating the active switch circuit 40 wherein the operational amplifier 44 opens and closes the MOSFET 46 by an external logic control line 60, which by way of example only, may be an output control signal generated from a computer algorithm or microelectronic device. The embodiment shown in FIG. 4 may have less than 6 micro amps of reverse current. Referring now to FIG. 5, there is shown another embodiment wherein the active switch circuit 40 can be controlled by a logic input 62 to the battery charge regulator 44 (which by way of example only is a Maxim 1736 chip regulator). FIG. 5 allows a small amount of back flow current to exist. Maximum back flow current to the solar array 34 from the battery 38 is approximately 160 mirco amps through the battery regulator 44. This is a tolerable situation since with a minimal amount of full sun exposure, forward charging will compensate for the small amount of charge lost due to the back flow current.

Figure 6:
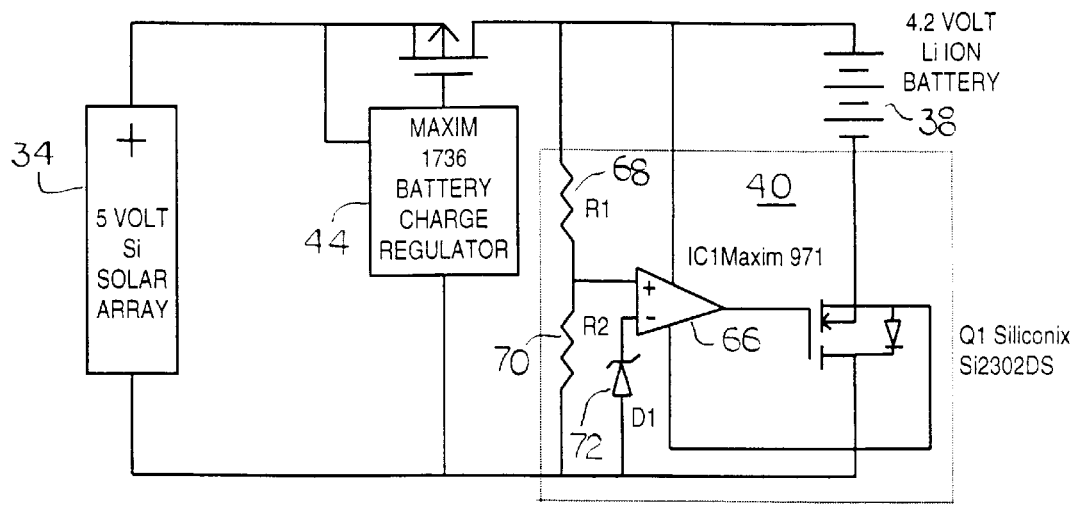
FIG. 6 shows a simplified circuit diagram incorporating an active switch circuit utilizing a photo transistor.

Referring now to FIG. 6, there is shown an active switch circuit 40 operating as a battery protector circuit. In this configuration comparitor IC1 66 compares the divided battery voltage from voltage divider R1 68 and R2 70 to the voltage at the reference diode D1 72. If the divided voltage is higher than the reference voltage, the active low loss switch remains on and passes current. If the divided voltage is lower than the reference voltage, the active low loss switch turns off and passes no current thus protecting the battery 38 from over discharge. R1 68 and R2 70 are set to keep the battery 38 from going below a predetermined safe battery voltage. The circuit shown in FIG. 6 allows a small amount of back flow current to exist. Maximum back flow current to the solar array 34 is approximately 180 mirco amps through the battery regulator 44. This is a tolerable situation since with a very small amount of full sun exposure on the solar array 34, the forward charging will compensate for the small amount of charge lost due to the back flow current. Complete drain of the battery 38 is prevented by the "battery low voltage cutoff" active switch. More specifically, complete drain of the battery is prevented by the "active switch" of the battery protector circuit that prevents current flow in an "under voltage" condition of the battery i.e.: approximately 2 volts for a 4.2 Lithium ion battery.

Figure 7:
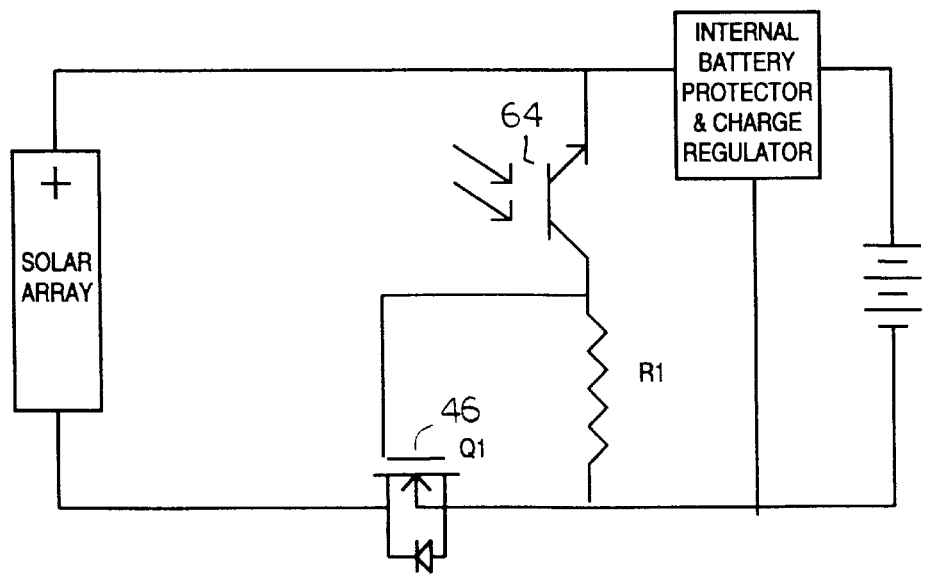
FIG. 7 shows a simplified circuit diagram incorporating an active switch circuit as an internal battery protection circuit.
Figure 8:
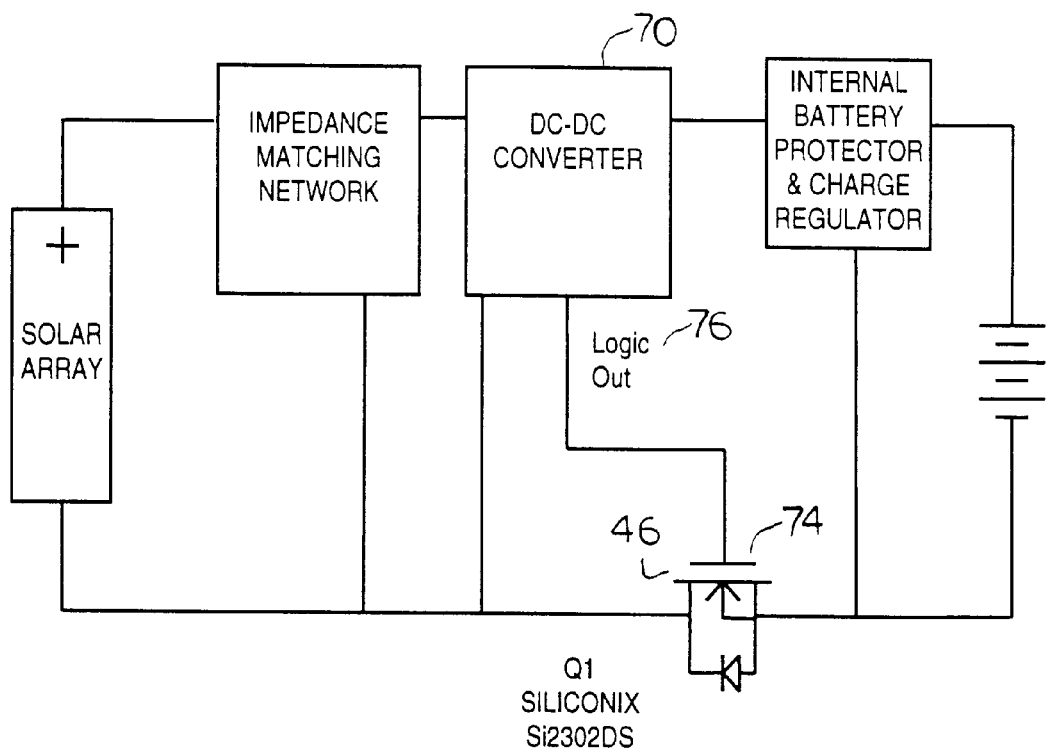
FIG. 8 shows a simplified circuit diagram incorporating an active switch circuit utilizing an impedance matching DC to DC convertor circuit.

In yet another embodiment, FIG. 7 shows using a phototransistor 64 as the logic input to control the MOSFET Q1 46 in an active switch configuration. Exposing the photo transistor to light causes its internal resistance to lower which causes current to flow in R1 and turn on the MOSFET active switch Q1. In still yet another embodiment, FIG. 8 shows using an impedance matching circuit and a DC—DC converter circuit 70 to control the active switch. A logic pin-out port 76 from the DC—DC converter circuit 70 is used with a VISHAY 2N4858A MOSFET 74 as the logic input to control the MOSFET Q1 46 in an active switch configuration. There is less than 1 micro amps of reverse current in this configuration.

It should further be noted that numerous changes in details of construction, combination, and arrangement of elements may be resorted to without departing from the true spirit and scope of the invention as hereinafter claimed.

What is claimed is:
1. An active switch charging system, comprising:
   an intermittent current limited power source;
   a device for storing charge; and
   an active switch for electrically connecting and disconnecting the power source to the device wherein when disconnecting the power source from the device the active switch allows a minimal amount of reverse back current flow from the device to the power source.
2. The active switch charging system according to claim 1, wherein the active switch further comprises:
   a field effect transistor operated by logic control.
3. The active switch charging system according to claim 2, wherein the logic control further comprises:
   a reverse current detector.
4. The active switch charging system according to claim 3, wherein the reverse current detector further comprises:
   an differential amplifier.
5. The active switch charging system according to claim 2, wherein the logic control further comprises:
   a voltage threshold detector.
6. The active switch charging system according to claim 5, wherein the voltage threshold detector further comprises a comparitor.
7. The active switch charging system according to claim 5, wherein the voltage threshold detector further comprises:
   an operational amplifier.
8. The active switch charging system according to claim 5, wherein the voltage threshold detector further comprises:
   a battery protection circuit.
9. The active switch charging system according to claim 5, wherein the voltage threshold detector further comprises:
   a battery regulation circuit.
10. The active switch charging system according to claim 2, wherein the logic control further comprises:
    a light source detector.
11. The active switch charging system according to claim 2, wherein the logic control further comprises:
    a power detector.
12. The active switch charging system according to claim 3, wherein the logic control further comprises:
    a "loss less" current flow detector.
13. An active switch charging system, comprising:
    an intermittent current limited power source;
    a device for storing charge; and
    a field effect transistor operated by logic control for electrically connecting and disconnecting the power source to the device wherein when disconnecting the power source from the device the active switch allows a minimal amount of reverse back current flow from the device to the power source.
14. The active switch charging system according to claim 13, wherein the logic control further comprises:
    a reverse current detector.
15. The active switch charging system according to claim 14, wherein the reverse current detector further comprises:
    an differential amplifier.

16. The active switch charging system according to claim 13, wherein the logic control further comprises:

a voltage threshold detector.

17. The active switch charging system according to claim 16, wherein the voltage threshold detector further comprises:

a comparitor.

18. The active switch charging system according to claim 17, wherein the voltage threshold detector further comprises a battery protection circuit.

19. The active switch charging system according to claim 17, wherein the voltage threshold detector further comprises a battery regulation circuit.

20. A solar switch comprising a field effect transistor operated by an operational amplifier for electrically connecting and disconnecting a solar source to a device whereby when disconnecting the solar source from the device a minimal amount of reverse back current flow from the device to the solar source is allowed.

* * * * *